(12) United States Patent
Park et al.

(10) Patent No.: US 10,102,555 B2
(45) Date of Patent: Oct. 16, 2018

(54) SYSTEMS AND METHODS FOR FACILITATING THE PURCHASE OF ONE OR MORE VEHICLES

(71) Applicant: Autotrader.com, Inc., Atlanta, GA (US)

(72) Inventors: Nicholas James Park, Atlanta, GA (US); Melanie Allgood Hygema, Atlanta, GA (US); Brett Michael Kelly, Atlanta, GA (US); Brian Cameron Zavitz, Cumming, GA (US); Pamela Ann Russek, Virginia Beach, VA (US); Jose Ignacio Puente, Johns Creek, GA (US)

(73) Assignee: AUTOTRADER.COM, INC., Atlanta, GA (US)

( * ) Notice: Subject to any disclaimer, the term of this patent is extended or adjusted under 35 U.S.C. 154(b) by 991 days.

(21) Appl. No.: 13/661,255

(22) Filed: Oct. 26, 2012

(65) Prior Publication Data

US 2014/0067615 A1 Mar. 6, 2014

Related U.S. Application Data

(60) Provisional application No. 61/696,666, filed on Sep. 4, 2012.

(51) Int. Cl.
*G06Q 30/06* (2012.01)

(52) U.S. Cl.
CPC ..... *G06Q 30/0601* (2013.01); *G06Q 30/0629* (2013.01); *G06Q 30/0631* (2013.01); *G06Q 30/0643* (2013.01)

(58) Field of Classification Search
CPC .......................................... G06Q 30/06–30/08
USPC ................................. 705/26.1–27.2
See application file for complete search history.

(56) References Cited

U.S. PATENT DOCUMENTS

| | | | |
|---|---|---|---|
| 5,983,220 A | 11/1999 | Schmitt | |
| 6,895,388 B1 | 5/2005 | Smith | |
| 6,901,430 B1 | 5/2005 | Smith | |
| 7,130,821 B1 * | 10/2006 | Connors | G06Q 30/00 705/26.5 |
| 7,216,094 B2 | 5/2007 | Kelly et al. | |
| 7,627,503 B1 | 12/2009 | Champagne et al. | |

(Continued)

FOREIGN PATENT DOCUMENTS

KR 100822914 B1 * 4/2008

OTHER PUBLICATIONS carmax.com, May 25, 2012, available at: http://web.archive.org/web/20120525023544/http://www.carmax.com/enus/zip-entry/default.html?ANa=4294967007&Ep=search %3afindcar%3ahome.*

(Continued)

*Primary Examiner* — Ming Shui
(74) *Attorney, Agent, or Firm* — Eversheds Sutherland (US) LLP

(57) ABSTRACT

Illustrative embodiments may generally be directed to, among other things, a platform for providing information to one or more consumers to facilitate the purchase of one or more vehicles. In one embodiment, the platform may provide information associated with one or more OEMs and their vehicle product lines. In another embodiment, the platform may facilitate selecting, building, modifying, comparing, and/or purchasing one or more vehicles. In yet another embodiment, the platform may determine inventory data corresponding to actual available inventory at one or more dealerships.

20 Claims, 11 Drawing Sheets

(56) References Cited

U.S. PATENT DOCUMENTS

| | | |
|---|---|---|
| 8,219,464 B2 | 7/2012 | Inghelbrecht et al. |
| 2003/0184574 A1* | 10/2003 | Phillips ................... G06F 3/016 |
| | | 715/702 |
| 2004/0128224 A1* | 7/2004 | Dabney et al. ................. 705/37 |
| 2007/0185777 A1* | 8/2007 | Pyle et al. ...................... 705/26 |
| 2008/0133426 A1 | 6/2008 | Porat et al. |
| 2008/0195952 A1 | 8/2008 | Ewing et al. |
| 2008/0222402 A1 | 9/2008 | Connors et al. |
| 2010/0125500 A1* | 5/2010 | Beavers ............ G06Q 30/0253 |
| | | 705/14.51 |
| 2010/0153235 A1* | 6/2010 | Mohr ..................... G06Q 10/00 |
| | | 705/26.1 |
| 2011/0264552 A1* | 10/2011 | Seergy ................... G06Q 30/06 |
| | | 705/26.3 |
| 2011/0264595 A1* | 10/2011 | Anspach ................ G06Q 30/02 |
| | | 705/306 |
| 2012/0254087 A1* | 10/2012 | Visel .................... G06F 17/271 |
| | | 706/26 |

OTHER PUBLICATIONS autotrader.com, Aug. 27, 2012.*
Cars.com, Oct. 18, 2011, available at: http://web.archive.org/web/20111018141139/http://www.cars.com/.*
Explicitly State the Difference Between Options, Jakob Nielsen, Nov. 3, 3013.*
International Search Report and Written Opinion for International Application No. PCT/US2013/057844 dated Dec. 24, 2013.
PSCars.com (http://www.pscars.com) as printed Oct. 26, 2012.

* cited by examiner

SYSTEMS AND METHODS FOR FACILITATING THE PURCHASE OF ONE OR MORE VEHICLES

CROSS-REFERENCE TO RELATED APPLICATIONS

This application claims the benefit of and priority to U.S. Provisional Patent Application No. 61/696,666, filed Sep. 4, 2012, which is hereby incorporated by reference in its entirety.

BACKGROUND

Original equipment manufactures (OEMs) often showcase their product lines at automotive shows, which require that the OEMs purchase a designated space within the automotive show. The OEMs may purchase varying sized spaces and display their product lines as they see fit. For example, some OEMs may purchase small spaces and display a few vehicles with no additional information; while other OEMs may purchase large spaces and include, among other things, digital displays, stages, presentations, and/or other advertising, such as interactive games, content, and/or media to enhance the consumer experience.

While automotive shows provide a wealth of information to consumers, they do have several drawbacks. For example, typical automotive shows are limited to a specific time at a specific location and include high overhead costs resulting from space rental, moving display items, staffing displays, and hiring entertainment, etc. Further, automotive shows are in no way configured to the personal tastes of individual consumers. Thus, finding ways to provide the automotive show experience to a larger audience at a more reasonable cost continues to be a priority.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The same reference numbers in different figures indicate similar or identical items.

DETAILED DESCRIPTION

Overview

Figure 1:
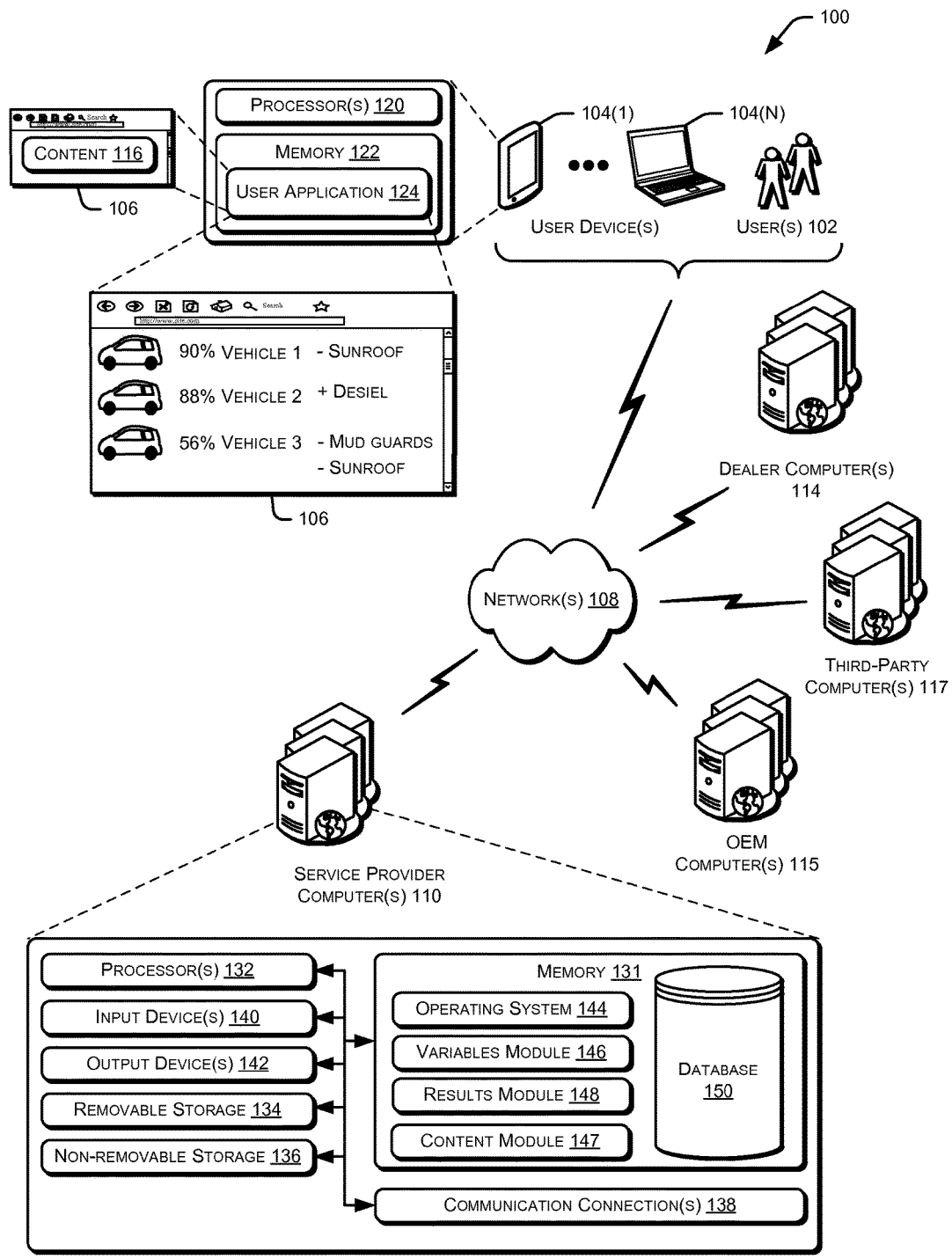
FIG. 1 is a block diagram of an illustrative system, according to an embodiment of the disclosure.

Illustrative embodiments of the disclosure will now be described more fully hereinafter with reference to the accompanying drawings, in which some, but not all embodiments are shown. The disclosure may be embodied in many different forms and should not be construed as limited to the embodiments set forth herein; rather, these exemplary embodiments are provided so that this disclosure will satisfy applicable legal requirements. As noted above, like numbers refer to like elements throughout.

Illustrative embodiments of the disclosure may generally be directed to, among other things, a platform for providing information to one or more consumers to facilitate the purchase of one or more vehicles. For example, in one embodiment, the disclosure may be directed to, among other things, a platform for providing information associated with one or more OEMs (and, in some instances, their associated distributors and/or dealers) and their vehicle product lines. In another example embodiment, the disclosure may be directed to, among other things, a platform for selecting, building, modifying, comparing, and/or purchasing one or more vehicles. In yet another example embodiment, the disclosure may be directed to, among other things, a platform for determining inventory data corresponding to actual available inventory at one or more dealerships, based upon, for example, a user's desired build of one or more vehicles.

The platform, according to an example embodiment, may have access to complete, or near compete, data associated with one or more OEMs and their vehicle product lines. The platform may also have access to complete, or near compete, data associated with inventory data corresponding to actual available inventory at one or more distributors and/or dealerships. Further, the platform may have access to complete, or near compete, data associated with one or more third parties for pricing, financing, and/or insuring the one or more vehicles.

The platform may be accessible over a public or private network, such as the Internet (which, throughout this Detailed Description should be read to also include mobile web and mobile networking) by one or more consumers or users. These consumers, according to one example embodiment, may interact with a server, or other computing device, of the platform by way of software implementation on a computing device of the consumers and/or via a Web application of the platform.

The platform, according to one example embodiment, may provide a virtual automotive show by way of, for example, a Web application where one or more consumers may access a variety of information associated with one or more OEMs (or the OEMs associated distributors and/or dealers) and their product lines. In certain aspects, the platform may include one or more interactive user application interfaces (e.g., WebPages) for providing and/or receiving data to and from the consumers.

In one example embodiment, the platform may be configured to provide one or more visual representations of the OEMs. In certain aspects, the arrangement and content associated with the visual representations of the OEMs may be based at least in part on a predetermined relationship, such as, but not limited to, a fee paid by the OEMs for preferential placement, display, enhancements (such as, e.g., audio/visual upgrades or the incorporation of tactile or haptic response), and/or arrangement of their logos, brands, and/or product lines on one or more of the user application interfaces. Moreover, in other aspects, the placement, display, enhancements, and/or arrangement of the OEMs and their product lines may be partially and/or wholly determined by the consumers and/or a default setting. That is, the platform may be configured to determine and/or receive an indication from the consumers (explicitly or by the platform determining an interest or potential preference from analysis of user interaction) that certain OEMs and their product lines are preferred over others, with the preferred OEMs and/or product lines being predominantly featured and/or featured separately.

In some instances, consumers may customize their interface. That is, consumers may select preferred vehicles from a product line and be presented with a configured interface of those preferred vehicles and related content. For example, consumers may set preferences for the content that they prefer (e.g., video, articles, games, etc.) and that content may be presented with the preferred vehicles.

According to one example embodiment, the platform may be configured to receive an indication of a selection of at least one of the OEMs. That is, the consumers may select, from the arrangement of the one or more OEMs discussed above, a particular OEM or a number of OEMs. In this manner, once the consumers have selected the particular OEM, the platform may be configured to provide a visual representation of one or more product lines (e.g., vehicle makes, models, trims, configurations, options, or the like) associated with the selected OEM.

In some instances, according to an example embodiment, the content associated with the visual representation of the one or more product lines may be based at least in part on the predetermined relationship as noted above. For example, the OEMs may pay a fee (or provide other consideration) for the ability to control, add, and/or enhance the content associated with the product lines on the one or more user application interfaces. In certain aspects, the amount of control over the content associated with the product lines may be relative to the fee paid. For example, the greater the fee, the more control the OEM may have over the content associated with their product lines. In this manner, the product lines of the OEMs that pay the lowest fees may include basic information presented to the one or more consumers about the product lines, such as, but not limited to, basic photographs and/or descriptions. On the other hand, the product lines of the OEMs that pay greater fees may include enhanced content, such as, but is not limited to, additional information about the product lines, enhanced photos, graphics, videos, multimedia, visual displays, or the like. In some instances, these enhanced content options may be provided in response to fees received from dealers and/or dealer groups, independently of or in addition to fees received from OEMs.

Similarly, according to an example embodiment, the platform may be configured to receive an indication of a selection of a particular vehicle from the one or more vehicle product lines. That is, the consumers may select, from the product lines discussed above, a particular vehicle or a number of vehicles. In this manner, once the consumers have selected the particular vehicle, the platform may be configured to provide a visual representation of the particular vehicle. Again, the content associated with the visual representation of the particular vehicle and/or how the visual representation is presented to the one or more consumers may be based at least in part on the predetermined relationship. In some instances, particular vehicles and enhancements may be supplied (and paid for) by the OEMs, dealers, and/or dealer groups.

Accordingly, in some instances, the content and visual representation associated with the particular vehicle may be dependent on the fee paid by, for example, the OEMs, the one or more dealers, and/or the dealer groups. For example, the basic content associated with the particular vehicle may include such information as vehicle characteristics, specifications, features, news, options, values, or ratings; while enhanced content may include the aforementioned information in addition to, for example, an interactive visual representation of the particular vehicle and/or enhanced graphics, videos, or multimedia associated with the particular vehicle. Other enhancements may also be added.

The functionality describe herein with regard to the OEMs may equally be applicable to one or more dealers and/or dealer groups. For example, the platform may be configured to provide one or more visual representations of the dealers and/or dealer groups. Likewise, the arrangement and content associated with the visual representations of the dealers and/or dealer groups may be based at least in part on a predetermined relationship, such as, but not limited to, a fee paid the dealers and/or dealer groups. In addition, the consumers may select, from an arrangement of the one or more dealers and/or dealer groups, a particular dealer and/or dealership group. In such instances, the consumers may be directed to, for example, a webpage (internal or external of the platform) associated with the selected dealer and/or dealership group. From there, the users may, among other things, select, build, modify, compare, purchase, and/or finance one or more vehicles.

According to one example embodiment, once a particular vehicle has been selected, the platform may be configured to determine inventory data corresponding to actual available inventory at one or more dealerships for the particular vehicle. The inventory data may be based at least in part on data received from one or more inventory databases (such as, but not limited to, dealership management systems (DMSs)) of the dealerships. In this manner, the platform may present the consumers with information on where the particular vehicle is available, i.e., which dealerships have the particular vehicle currently in stock. Moreover, the platform may include a filter function so that the consumers may limit (or filter) the dealership results to a geographic location or region, such as locally, regionally, or nationally. In addition, in some examples, the filter function may allow the consumers to restrict the dealership results by other amenities, dealer ratings, or other consumer preferences.

The platform, according to one example embodiment, may be configured to provide information associated with one or more third parties. That is, in some instances, the platform may provide the consumers with information corresponding to one or more third parties, such as, but not limited to, one or more service providers for pricing, financing, and/or insuring a purchase of the particular vehicle. In this manner, the platform (via the one or more service providers) may provide the consumers with information regarding pricing, financing, insurance, or the like. To this effect, in certain embodiments of the disclosure, the platform may include one or more virtual kiosks associated with the one or more service providers; wherein the consumers may solicit information from the one or more third parties directly from the kiosk within the platform. For example, in one aspect, the virtual kiosks may enable the interaction with third-parties by the users to gain additional information relevant to a purchase, e.g., updating insurance information, getting quotes for updated insurance based on actual insurance records, financing options, etc. Similarly, aftermarket accessory providers may also have their own virtual kiosks within the platform from which consumers may solicit information on potential customizations.

In some instances, OEMs, dealers, and/or dealer groups can also have kiosks within the platform. For instance, an OEM may want to have a kiosk to highlight a new model, feature (such as an eco-boost, safety system, or electronic system, etc.), and a dealer may want to highlight their service department, aftermarket offerings, particular vehicles, etc. In certain embodiments, the kiosks may be a collection of multimedia graphics, text, etc. For example, the kiosks may include multimedia content centers and/or interactive information centers used by any provider of content to the platform, including OEMs, dealers, or third parties.

In an example embodiment, the platform may be configured to enable the consumers to modify a representation of an existing vehicle so as to build or configure a desired vehicle. Similarly, the platform may be configured to enable the consumers to build or configure a desired vehicle from a generic representation of a vehicle, such as a sedan or SUV. In this manner, in some instances, the platform may be configured to receive an indication of a selection of one or more desired characteristics or features associated with a particular vehicle. Without limitation, the term desired characteristic may imply a qualitative property of a vehicle, such as powerful, roomy, sporty, economical, etc., and the term desired feature may imply a quantitative property of a vehicle, such as 6-cylinder, 4-door, sunroof, etc. For example, the consumers may modify the particular vehicle by adding and/or deleting features, such as, but not limited to, a sunroof, rims (wheels), tires, window tint, audio systems, navigations systems, connectivity systems, or the like.

In another example embodiment, the platform may be configured to determine, based at least in part on the modifications, inventory data corresponding to actual available inventory at one or more dealerships for the particular vehicle comprising the one or more desired characteristics or features. In some instances, this inventory data may update in real-time in response to inputs received from the user. In certain aspects, the inventory data may be determined in a similar fashion as previously noted. In other instances, if the particular vehicle comprising the one or more desired characteristics or features is not currently in inventory, the consumers may place an order or indicate a preference to place an order directly with one or more of the OEMs, or with a dealer of that OEM, through the platform. Further, the platform may be configured to determine a price, payment information (such as, but not limited to, down payment information, interest rates, incentives, a trade-in value, or the like), remaining warranty value form a trade, or insurance costs, etc. for the particular vehicle comprising the one or more desired characteristics or features.

In some instances, the ability of the consumers to modify a representation of a vehicle so as to build or configure a desired vehicle may be limited to what is actually available in dealer inventory (which may be filtered geographically or otherwise). For example, if a user tries to build/configure a vehicle in such a manner that there is no available matching vehicle in actual available inventory at one or more dealerships, the platform may (1) not allow the build or configuration or (2) provide a notification or suggestion to the user. In some examples, depending on the desired build or configuration, the platform may be configured to provide the user with information on the cost to have a dealer modify actual inventory to meet the desired build or configuration (when possible). In this manner, the platform may be adapted to crosscheck the desired build or configuration against inventory and continuously filter the returned results accordingly. This may be done in real-time, or it could be done with an indication that the user now desires the system to filter the results.

In certain example embodiments, the information received by the platform from the consumers may be provided to the OEMs and/or dealers. In this manner, the OEMs and/or dealers may use the information to design and/or configure their product lines to meet consumer demands. For example, certain vehicle configurations may be assembled and sent to certain parts of the country based on regional demands determined by the consumer information received and/or determined by the platform.

The platform, according to an example embodiment, may be configured to determine, based at least in part on the one or more desired characteristics or features, one or more comparably configured vehicles comprising one or more makes, models, trims, customizations, or combinations thereof that correspond to the particular vehicle and the one or more of the desired characteristics or features associated with the particular vehicle. In this manner, in some instances, the consumers may be presented with a number of comparable vehicles based on their desired vehicle configuration. For example, in some instances, the platform may receive an indication of a desired build of a particular vehicle by a user. Using this information, other vehicles may be identified that are comparable to the initial vehicle including any added options or features. In this manner, the platform may build the other identified vehicles to be as comparable as possible to the desired build. That is to say, in one example, if a user builds a vehicle (e.g., a Camry), the platform may present other vehicles (e.g., Accords, Tauruses, etc.) that have comparable builds. The platform may also make note or present how these other comparably built vehicles differ (due to different trim packages, etc.) from the initial vehicle. In addition, the platform may indicate to the consumer the differences in price for each of the comparable vehicles.

In some instances, the platform can present comparisons based on any model, configuration, or piece of inventory. Moreover, the comparisons can be based on a vehicle just presented to a user, a saved configuration, a randomly selected vehicle, different trims of the same vehicle, or multiple completely different vehicles (e.g., a Rolls Royce, an F-150, and a Volt, etc).

In certain aspects, the information associated with the one or more comparable vehicle may be determined and/or received from one or more manufacturer databases, one or more distributor databases, one or more dealer databases, or the like. This information may be crosschecked against the various databases and deduped to ensure accuracy.

According to an example embodiment, the platform may be configured to complete one or more transactions. For example, in certain aspects, the platform may be configured to receive an indication of a selection of one or more dealerships. That is, a consumer may select one or more dealerships in order to view an inventory of the one or more dealerships. In this manner, in certain embodiments, the platform may be configured to determine inventory data corresponding to actual available inventory at the selected dealerships. Moreover, the platform may be configured to receive an indication of a selection of one or more vehicles in the actual inventory of the one or more dealerships. That is, the consumer may select a specific vehicle in the inventory of the dealerships. Further, the platform may be configured to receive, from the consumer, an indication of at least one of: (1) an offer to the one or more dealerships for the one or more vehicles; or (2) a request for one or more offers from the one or more dealerships for the one or more vehicles. In other words, the consumer may make an offer to the one or more of the dealerships for the one or more of the vehicles, or the one or more consumers may request multiple offers from the one or more dealerships for the one or more vehicles in a reverse auction type transaction. In certain embodiments, the selection and/or transaction parameters may be based at least in part on an incentive, a specific vehicle make, a specific dealer, a particular vehicle, or combinations thereof. The transaction parameters may be transmitted to the one or more dealerships for evaluation.

In one example embodiment, the platform may include communication functionality, such as an online chat or audio/visual function or the like, for receiving and/or transmitting communications between the consumer and the one or more dealerships, OEMs, or third-parties with kiosks. In this manner, in some instances, the transaction parameters as noted above may be further negotiated over the platform via the communication function.

The platform, according to an example embodiment, may be configured to facilitate the selection and comparison of one or more vehicles. For example, in certain aspects, the platform may be configured to receive one or more weighted variables that each indicate a desired characteristic or feature of a vehicle. In some instances, the platform may be configured to receive weighted variables corresponding to cabin size (e.g., height, legroom, etc.), luxury, power, ride, appearance, technology, environmental factors, towing capability, or any other variable described herein. That is, the consumers may select any number of characteristics or features that they deem desirable in a vehicle. In certain aspects, the one or more weighted variables may correspond to a virtual representation of the desired characteristics or features of the vehicle.

In one example embodiment, the platform may be configured to determine, based at least in part on the one or more weighted variables, one or more vehicles comprising one or more makes, models, trims, customizations, or combinations thereof that correspond to one or more of the desired characteristics of the vehicle. That is, the platform may be adapted to determine one or more vehicles that match the weighted variable criteria as selected by the user. As such, in certain embodiments, the platform may further be configured to determine inventory data corresponding to actual available inventory at one or more dealerships for each of the one or more vehicles. That is, in various embodiments, the platform may first present vehicles that correspond to the weighted variables received from the user and then determine actual available inventory corresponding to such vehicles, or the platform may initially present actual available inventory of vehicles that corresponds to the weighted variables received from the user. For example, the platform may prevent a user from selecting certain characteristics or features that are not available in actual inventory. Further, depending on the embodiment, the actual available inventory may be determined in real-time as various weighted variables are received. Accordingly, the consumers may be presented with one or more vehicles comprising one or more of the desired characteristics or features, and the one or more dealerships where the vehicles may be located. In addition, in certain embodiments, the user may be presented with one or more comparably configured vehicles that may include some or all of the desired characteristics or features. Moreover, the platform may include a filter function so that the one or more consumers may limit (or filter) the dealership results to a geographic location or any of the other filters previously listed.

In certain aspects, the platform may be configured to determine a metric indicative of a degree of match between each of the one or more vehicles and the one or more weighted variables. In other aspects, the platform may be configured to determine, based at least in part on the metric, a ranking of the one or more vehicles. In yet other aspects, the metric may be represented as one or more geometric shapes, graphs, charts, tables, or the like. In still other aspects, the platform may be configured to provide an indication of the desired characteristics differing in each of the one or more vehicles.

In some embodiments, the configuration data of the one or more vehicles may be collected, crosschecked, and/or deduped from one or more manufacturer databases, one or more distributor databases, one or more dealer databases, one or more financial entity database, or the like. For example, regional distributors, local distributors, and/or local dealerships may modify vehicles for any number of reasons at each stop during the distribution chain. In any case, the crosschecking and/or deduping of configuration data ensures that the information associated with the one or more vehicles is accurate and up-to-date.

In an example embodiment, the one or more weighted variables may comprise one or more vehicle options that each indicate the desired characteristics or features of the vehicle. As noted above, and without limitation, the term desired characteristic may imply a qualitative property of a vehicle, and the term desired feature may imply a quantitative property of a vehicle. In other embodiments, the one or more weighted variables may comprise conflicting characteristics or features of the vehicle. According to an example embodiment, the one or more desired features may comprise, among other things, one or more of: price, style, age, make, model, color, mileage, vehicle identification number (VIN) information, condition, trim, vehicle options, sunroof, moonroof, navigation systems, dvd systems, digital music player connectivity, network connectivity, social connectivity, satellite radio, handsfree equipment, digital streaming capability, back-up cameras, back-up sensors, automated parallel parking capabilities, transmission type, paddle shifters, on-wheel controls, available seating, towing capability, drivetrain (AWD, FWD, 4WD, RWD), traction control, warranty, incentives, transmission (manual, automatic, cvt), fuel economy, fuel type (gas (regular or premium), ethanol blends (e.g., E85), flex fuel, natural gas, diesel, hybrid, electric, plug-in electric, solar, fuel cell, hydrogen, or combinations thereof), safety equipment (airbags, collision avoidance, or antilock brakes), turbo, supercharger, engine features (displacement, horsepower, cylinders, cylinder configuration, valves, valve configuration, cylinder deactivation, fuel economy controls), bed liners, covers, or wheels. Other characteristics and features may also be included.

While this Detailed Description is discussed with reference to vehicles, such as automobiles, the concepts described herein are not so limited. Those skilled in the art will understand that the concepts may also be applicable in other industries in which consumer-oriented product shows are conducted. For example, the concepts described herein may also be applied to consumer electronics, other types of vehicles (e.g., watercraft, planes, RVs, ATVs, work vehicles), fashion, furniture, home appliances and fixtures, or crafts, etc.

Illustrative Architecture

FIG. 1 illustrates an example system 100 for facilitating the purchase of one or more vehicles, according to an example embodiment. As shown in FIG. 1, the system 100 may include one or more service provider computers 110, one or more dealer computers 114, one or more third party computers 117, and one or more OEM computers 115. In addition, in system 100, one or more users 102 (e.g., consumers) may utilize computing devices 104(1), . . . , 104(N) to access one or more user application interfaces (or websites) 106 that may be provided by, created by, or otherwise associated with a service provider via one or more networks 108. In some instances, the computing devices (collectively 104) may be configured to present or otherwise display the user application interface 106 to the one or more users 102. Additionally, each of the aforementioned devices may be in communication with each other as well as with the service provider computer 110 over a network 108, such as the Internet or the like.

While the illustrated example represents users 102 accessing the user application interface 106 over the networks 108, the described techniques may equally apply in instances where the users 102 interact with a service provider via a personal computer, over the phone, via a kiosk, or in any other manner. It is also noted that the described techniques may apply in other client/server arrangements (e.g., set-top boxes, etc.), as well as in non-client/server arrangements (e.g., locally stored software applications, etc.).

The user devices 104 may be any type of computing devices including, but not limited to, desktop personal computers (PCs), laptop PCs, mobile phones, smart phones, personal digital assistants (PDAs), tablets PCs, game consoles, set-top boxes, wearable computers, e-readers, web-enabled TVs, cloud-enabled devices and work stations, or the like. In some instances and as illustrated, each user device 104 may be equipped with one or more processors 120 and memory 122 to store applications and data, such as user application 124 that may display the content 116 via the user application interface 106 and/or enable access to the Web site 106 stored on the service provider computers 110, or elsewhere.

The service provider computers 110 may be any type of computing devices such as, but not limited to, mobile, desktop, and/or cloud computing devices, such as servers. In some examples, the service provider computers 110 may be in communication with the user devices 104 via the networks 108, or via other network connections. The service provider computers 110 may include one or more servers, perhaps arranged in a cluster, as a server farm, or as individual servers not associated with one another. These servers may be configured to host a website 106 viewable via the user application 124 or any other Web browser accessible by a user 102 such as, but not limited to, one or more of the user devices 104.

In some aspects, the user application interface 106 may allow the users 102 to access, receive from, transmit to, or otherwise interact with the service provider via one or more service provider computers 110. In some examples, the user application interface 106 may also allow users 102 to receive, from the service provider computers 110 over the networks 108, information associated one or more OEMs and their product lines, information associated with one or more dealerships and/or dealerships groups, information associated with one or more third party service providers, information associated with dealership inventory data, information associated with one or more vehicles, information associated with initiating and/or completing a transaction, information associated with one or more kiosks, or the like. Further, in other examples, the user application interface 106 may also allow users 102 to receive, from the service provider computers 110 over the networks 108, information associated with selecting, configuring, building, modifying, comparing, and/or purchasing one or more vehicles.

According to one example embodiment, information associated with one or more OEMs and their products lines may be provided to the service provider computers 110 by the OEM computers 115 and/or one or more third party providers. Further, in some examples, information about inventory data for one or more vehicles may be provided to the service provider computers 110 by the dealer computers 114 and/or one or more third-party providers such as, but not limited to, DMSs, other inventory management systems, OEM databases, distributor databases, financial institution databases, or other inventory data feeds.

In one illustrative configuration, the service provider computer 110 comprises at least a memory 131 and one or more processing units (or processor(s)) 132. The processor(s) 132 may be implemented as appropriate in hardware, software, firmware, or combinations thereof. Software or firmware implementations of the processor(s) 132 may include computer-executable or machine-executable instructions written in any suitable programming language to perform the various functions described.

Memory 131 may store program instructions that are loadable and executable on the processor(s) 132, as well as data generated during the execution of these programs. Depending on the configuration and type of service provider computer 110, memory 131 may be volatile (such as random access memory (RAM)) and/or non-volatile (such as read-only memory (ROM), flash memory, etc.). The service provider computer 110 or server may also include additional removable storage 134 and/or non-removable storage 136 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 131 may include multiple different types of memory, such as static random access memory (SRAM), dynamic random access memory (DRAM), or ROM.

The memory 131, the removable storage 134, and the non-removable storage 136 are all examples of computer-readable storage media. For example, computer-readable storage media may include volatile and non-volatile, removable and non-removable media implemented in any method or technology for storage of information such as computer-readable instructions, data structures, program modules, or other data. Memory 131, removable storage 134, and non-removable storage 136 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computer 110 or other computing devices. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer 110 may also contain communication connection(s) 138 that allow the service provider computer 110 to communicate with a stored database, another computing device or server, user terminals, and/or other devices on a network. The service provider computer 110 may also include input device(s) 140 such as a keyboard, mouse, pen, voice input device, touch input device, etc., and output device(s) 142, such as a display, speakers, printers, etc.

Turning to the contents of the memory 131 in more detail, the memory 131 may include an operating system 144 and one or more application programs or services for implementing the features disclosed herein including a content module 147, a variables module 146, a results module 148, and an information database 150. In some instances, the various modules 146, 147, 148 may receive, transmit, and/or store information in the information database 150. The content module 147 may be configured to receive, store, create, transmit, and/or determine information associated with one or more OEMs and their products lines. Additionally, the content module 147 may be configured to present the information associated with the one or more OEMs and their product lines to the users 102 as content 116 via the user application interface 106. In this manner, the users 102 may receive, transmit, select, modify, update, and/or interact with the information associated with the one or more OEMs and their product lines by way of the user application interface 106 over the network 108.

Figure 2:
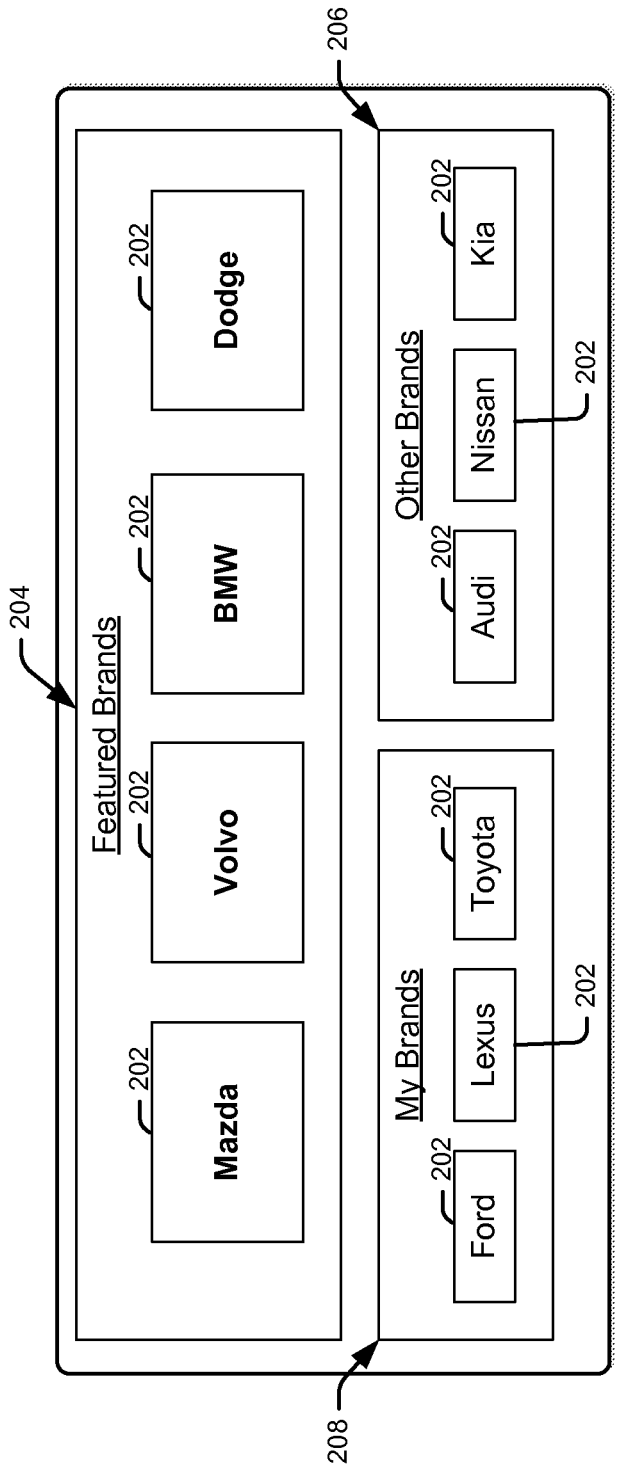
FIG. 2 is an example user application interface, according to an embodiment of the disclosure.

According to one embodiment as illustrated in FIG. 2, the content module 147 may be configured to provide information to the users 102 by way of the user application interface 106. In some examples, the content 116 may include one or more visual representations 202 of the one or more OEMs. In certain aspects, the arrangement and content associated with the visual representations 202 of the one or more OEMs may be based at least in part on a predetermined relationship, such as a fee received from the OEMs for preferential placement, display, enhancement, and/or arrangement of their logos, brands, and/or product lines on one or more of the Web pages. For example, as illustrated in FIG. 2, certain OEMs may be predominantly displayed as a featured brand 204; while other OEMs may be displayed less predominantly as other brands 206.

In some embodiments, the placement, display, enhancement, and/or arrangement of the OEMs may be partially and/or wholly determined by the users 102. That is, the content module 147 may be configured to determine and/or receive an indication from the users 102 that certain OEMs and their product lines are preferred over others, with the preferred OEMs and/or product lines being predominantly featured and/or featured separately, for example, under my brands 208.

Figure 3:
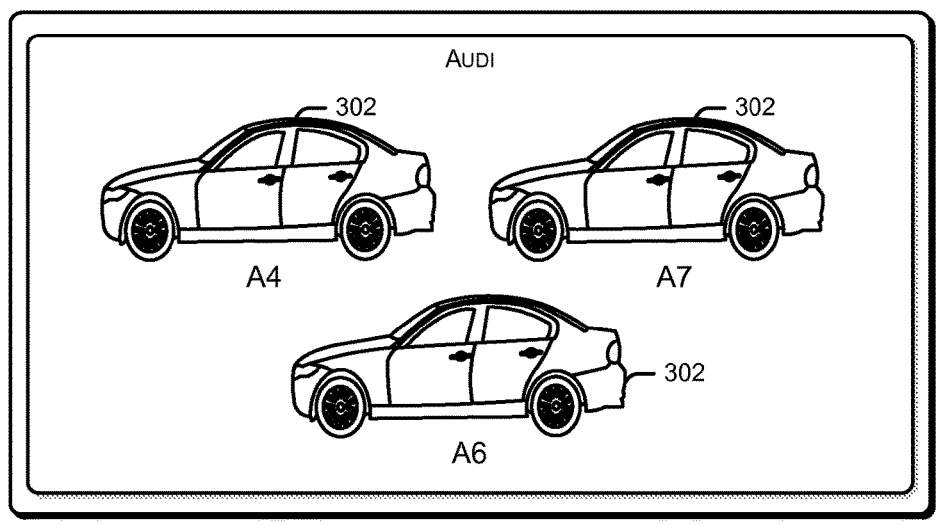
FIG. 3 is an example user application interface, according to an embodiment of the disclosure.

According to one example embodiment, the users 102 may select one or more of the visual representations 202 of the OEMs. In this manner, as illustrated in FIG. 3, once the users 102 have selected a particular OEM, the content module 147 may be configured to provide a visual representation 302 of one or more product lines (e.g., vehicle makes, models, trims, configurations, options, or the like) associated with the selected OEM. In some instances, like the content associated with the visual representations 202 of the OEMs in FIG. 2, the content associated with the visual representations 302 of the one or more product lines in FIG. 3 may be based at least in part on the predetermined relationship as noted above. For example, in some embodiments, the content associated with the visual representations 302 of the product lines may be enhanced by way of, but not limited to, enhanced photos, graphics, videos, multimedia, displays, descriptions, or the like.

In some examples, as illustrated in FIG. 3, the content associated with the visual representations 302 may be considered basic. That is, the only content associated with the visual representations 302 as depicted in FIG. 3 is the name of the vehicles and visual representations 302 themselves. Accordingly, the OEMs may pay a fee to enhance the content associated with their product lines. In some instances, the enhanced content may include, for example, imbedded videos, enhanced graphics (such as backgrounds or landscapes), or any other content paid for and/or provided by the OEMs that may provide the users 102 with additional information regarding the product lines and/or increase user interaction and visual appeal.

Figure 4:
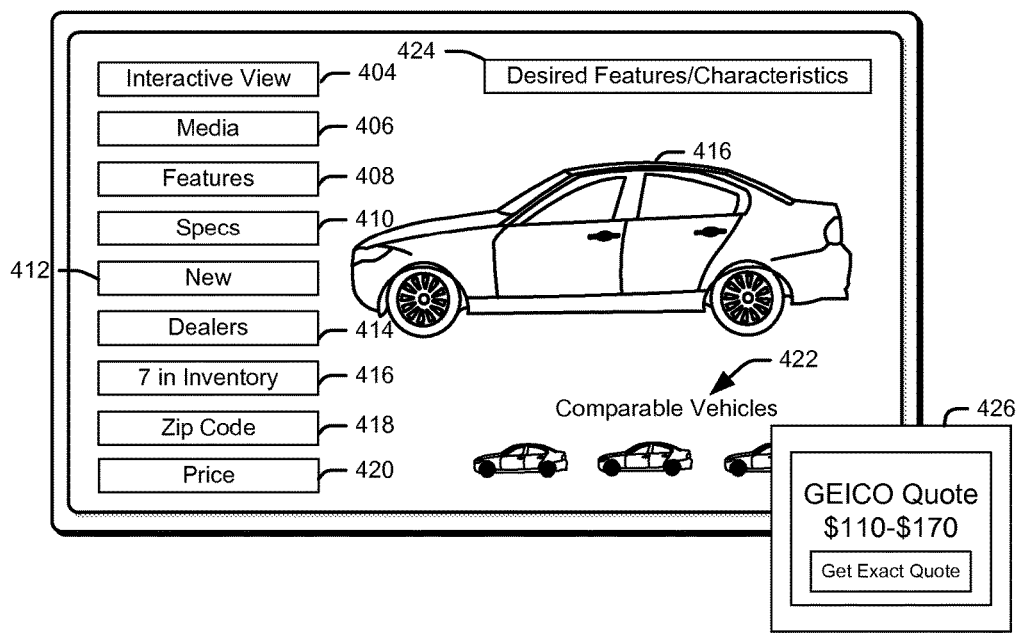
FIG. 4 is an example user application interface, according to an embodiment of the disclosure.

In certain example embodiments, the users 102 may select one or more of the visual representations 302 of a particular vehicle. In this manner, as illustrated in FIG. 4, once the users 102 have selected a particular vehicle, the content module 147 may be configured to provide a visual representation 402 of the particular vehicle. Again, the content associated with the visual representation 402 of the particular vehicle and/or how the content and visual representation is presented to the users 102 may be based at least in part on the predetermined relationship. In some instances, the content associated with the visual representation 402 may include one or more basic or enhanced interactive views 404 of the particular vehicle. In other instances, the content associated with the visual representation 402 may include one or more basic or enhanced media content 406 (such as videos of, for example, the interior and/or exterior) of the particular vehicle and/or information pertaining to one or more features 408 or specifications 410 associated with the particular vehicle. Further, the content associated with the visual representation 402 may include news 412 or other information.

In some instances, once a particular vehicle has been selected, the content module 147 may be configured to determine inventory data 416 corresponding to actual available inventory at one or more dealerships 414. The inventory data 416 may be based at least in part on data received from one or more inventory databases of the one or more dealerships 414 and/or other databases. In this manner, the users 102 may be provided with information on where the particular vehicle is available and currently in stock. Moreover, in some instances, the users 102 may enter a zip code 418 or be located via a geolocater or other technique to filter the dealership 414 results to a specific geographic location or region.

In certain example embodiments, the users 102 may be provided with information corresponding to one or more third parties, such as, but not limited to, one or more third party service provides for completing a transaction. For example, in some instances, the one or more third party service providers may provide information to the users 102 for pricing 420, financing (not shown), insuring 426, and/or any other transaction associated with the purchase of a vehicle. In some embodiments, the third party service providers may include one or more virtual kiosks 426 imbedded within the system such that the users 102 may solicit information associated with the third party service providers. In some instances, the kiosks 426 may be placed on the top, bottom, or other portion of the user application interface 106 to display data and/or hyperlinks for connecting with the third party service providers.

Still referring to FIG. 4, according to an example embodiment, one or more comparable vehicles 422 (or trim lines) may be determined and displayed to the users 102. For example, the one or more comparably configured vehicles 422 may include one or more makes, models, trims, customizations, or combinations thereof that correspond to visual representation 402 of the particular vehicle. Moreover, in some examples, the users 102 may be able to modify the particular vehicle. That is, the users may be able to select one or more desired characteristics or features 424 to include and/or remove from the visual representation 402 of the particular vehicle. Based on the user 102 modifications, the information associated with the interactive view 404, media content 406, features 408, specifications 410, news 412, dealers 414, inventory 416, and price 420 may all be updated to correspond to the user selected modification. Further, in some instances, the comparable vehicles 422 may be updated to correspond to the user selected modifications. In other instances, the platform may be configured to identify differences between the vehicle 402 and the comparable vehicles 422.

Figure 5:
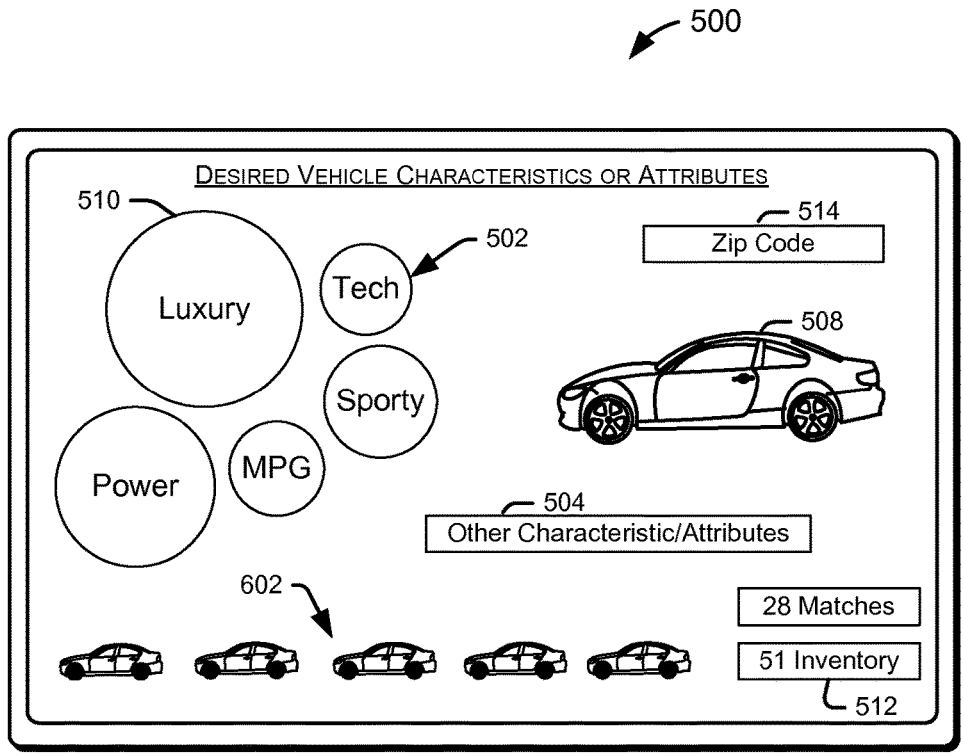
FIG. 5 is an example user application interface, according to an embodiment of the disclosure.
Figure 5:
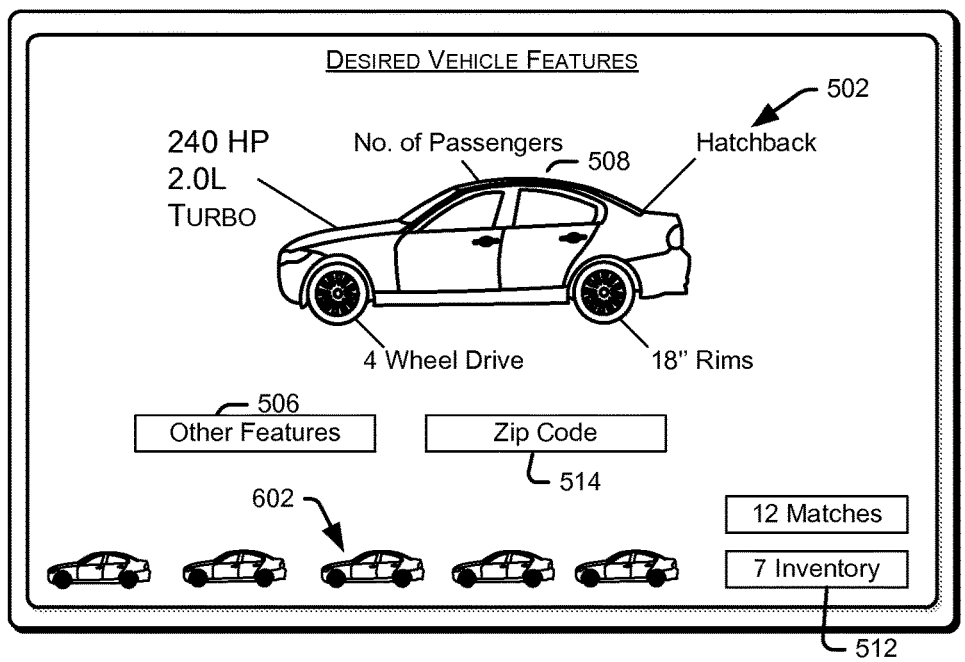

As noted above, the memory 131 may include a variables module 146 and a results module 148. In some examples, as depicted in FIG. 5, the variables module 146 may be configured to receive one or more weighted variables 502 that each indicate a desired characteristic 504 or feature 506 of a vehicle 508. That is, the user 106 may select any number of characteristics 504 or features 506 that they deem desirable in a vehicle. In certain aspects, the one or more weighted variables 502 may correspond to a virtual representation 510 of the desired characteristics 504 or features 506. For example, in the depicted example embodiment, the one or more virtual representations 510 of the desired characteristics 504 are circles. In this example, the larger the circle, the more weight given to the desired characteristic 504. In other instances, the desired characteristics 504 or features 506 may be selected from a list, where the user 106 may then enter a weight to assign to the desired characteristic 504 or features 506. In yet other instances, the desired characteristics 504 or features 506 may not be weighted, i.e., they may all be given equal consideration.

Figure 6:
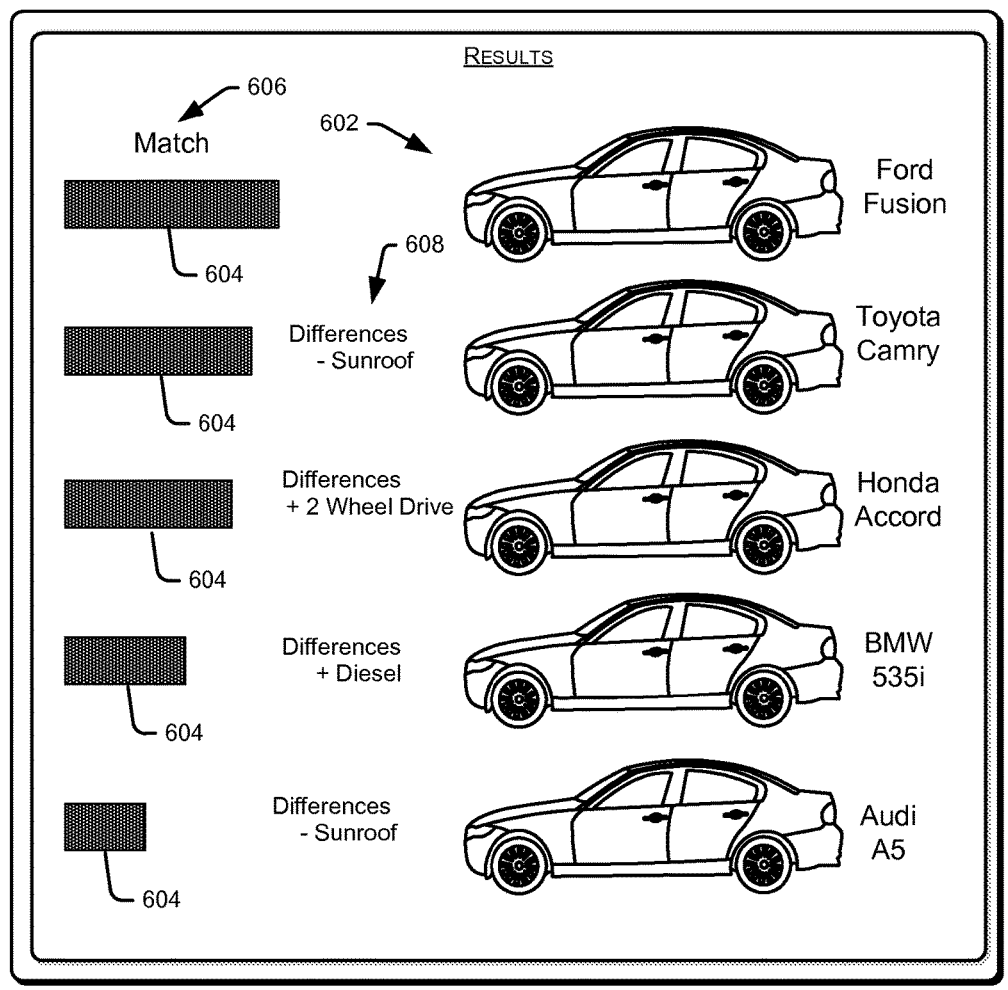
FIG. 6 is an example user application interface, according to an embodiment of the disclosure.

In some examples, as depicted in FIGS. 5 and 6, the results module 148 may be configured to determine, based at least in part on the one or more weighted variables 502, one or more vehicles 602 comprising one or more makes, models, trims, customizations, or combinations thereof that correspond to (or match) one or more of the desired characteristics 504 or features 506 selected by the user 106. As such, in some instances, the results module 148 may further be configured to determine inventory data 512 corresponding to actual available inventory at one or more dealerships for each of the one or more vehicles 602. Moreover, in some instances, the users 102 may enter a zip code 514 to filter the inventory 512 results to a specific geographic location or may elect to have the results filtered based on the geolocation capabilities of their computing/mobile device. In addition, in certain embodiments, the results module 148 may determine and present one or more comparably configured vehicles (similar to comparable vehicles 422) that may include some or all of the desired characteristics or features.

In certain embodiments, the results module 148 may be configured to determine a metric 604 indicative of a degree of match between each of the one or more vehicles 602 and the one or more weighted variables 502. In other instances, the results module 148 may be configured to determine, based at least in part on the metric 604, a ranking 606 of the one or more vehicles 602. In yet other instances, the metric 604 may be represented as one or more geometric shapes, graphs, charts, tables, or the like. Here, for example, the metric 604 is represented as a horizontal bar, wherein the larger the bar, the greater the match. In still other aspects, the results module 148 may be configured to provide an indication 608 of the desired characteristics differing in each of the one or more vehicles 602.

Figure 7:
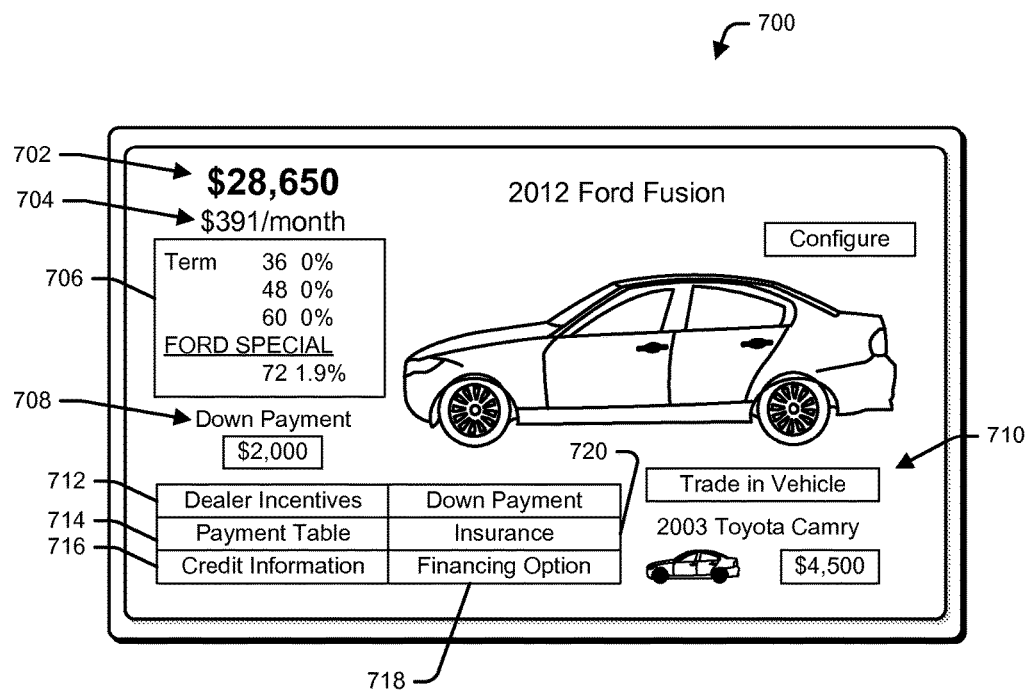
FIG. 7 is an example user application interface, according to an embodiment of the disclosure.

According to one example embodiment, once the user 102 has identified a vehicle of interest, the users 102 may be directed to a user interface, such as the example user interface 700 depicted in FIG. 7, where the user 102 may be presented with purchasing information associated with the particular vehicle. For example, the user interface 700 may include a total cost 702 for the vehicle, a monthly payment 704 for the vehicle, and/or one or more possible loan terms 706 offered by the OEM, dealer, and/or dealer group. Moreover, in some instances, the user 102 may be able to enter a down payment 708 and/or trade-in value 710. In other instances, the platform may be configured to determine a down payment 708 and/or trade-in value 710 based on information provided by the user 102, such as vehicle information and/or personal information. In this manner, based at least in part on the down payment 708 and/or trade-in value 710, for example, much of the purchasing information may be updated and/or modification. The example user interface 700 may also include information associated with dealer incentives 712, payment tables 714, credit information 716, financing options 718, insurance options 720, or the like. This information may be presented directly on the user interface 700 or provided as hyperlinks for directing the users 102 to additional interfaces containing further information on each topic.

Figure 8:
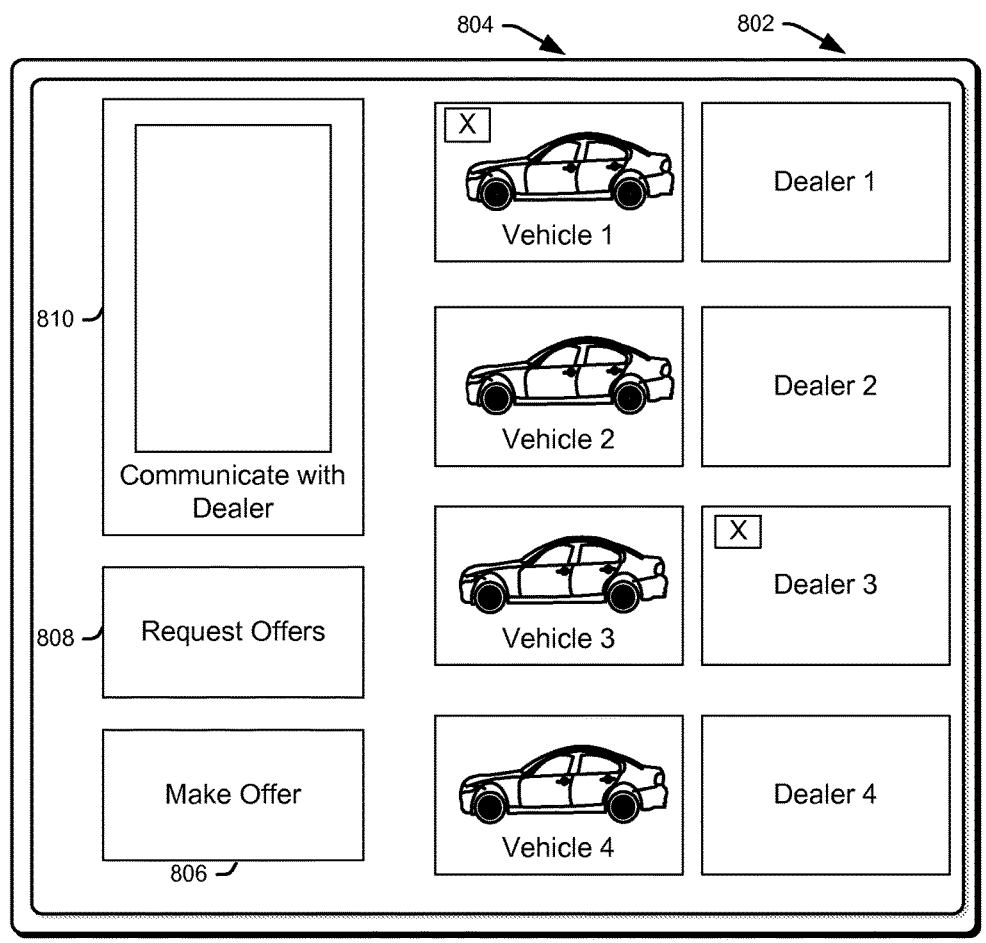
FIG. 8 is an example user application interface, according to an embodiment of the disclosure.

In some instances, the content module 147 may provide functionality to allow the users 102 to complete one or more transactions. For example, as depicted in FIG. 8, the users 102 may select one or more dealerships 802 (e.g., Dealer 3) to view and inventory 804 of the one or more dealerships 802. In certain aspects, the users 102 may then select a specific vehicle (e.g., Vehicle 1) in the inventory 804 of the one or more dealerships 802. Next, depending on the type of transaction the users 102 wish to initiate, the users 102 may (1) make an offer 806 to the one or more of the dealerships 802 for the one or more of the vehicles 804, or (2) the users 102 may request multiple offers 808 from the one or more dealerships 802 for the one or more vehicles 804 in a reverse auction type transaction. In this manner, the transaction parameters may be transmitted to the one or more dealerships 802 for evaluation.

In some instances, the content module 147 may further provide functionality to allow the users 102 to communicate with the one or more dealerships 802. In some examples, the users 102 and dealerships may communicate via an online chat forum 810 or the like. In this manner, the transaction parameters as noted above may be further negotiated or discussed over the platform via the chat forum 810.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example system 100 and service provider computer 110 shown in FIG. 1 are provided by way of example only. Numerous other operating environments, system architectures, modules, and device configurations are possible. Accordingly, embodiments of the present disclosure should not be construed as being limited to any particular operating environment, system architecture, or device configuration.

Illustrative Processes

Figure 9:
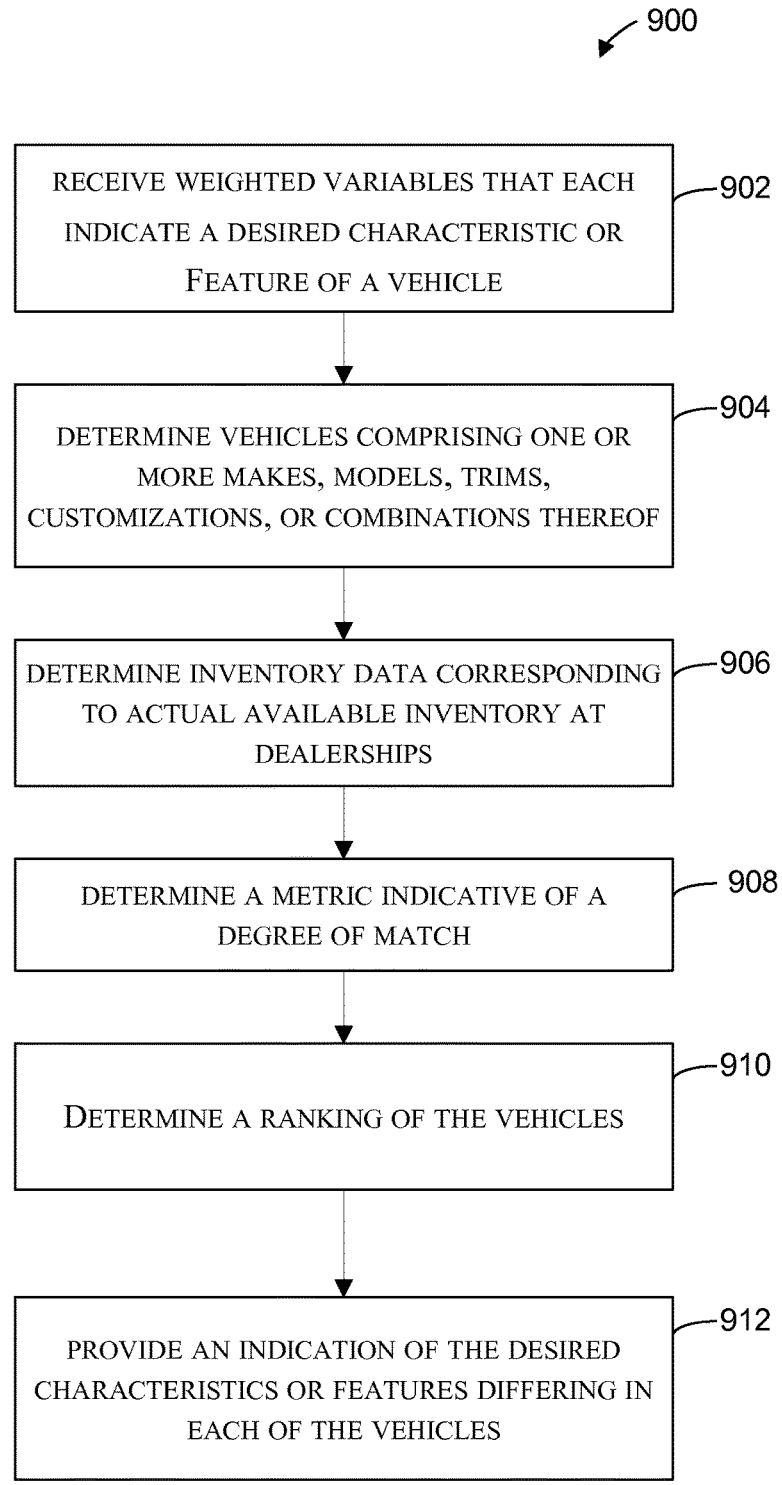
FIG. 9 is a flow diagram illustrating details of a method, according to an embodiment of the disclosure.
Figure 10:
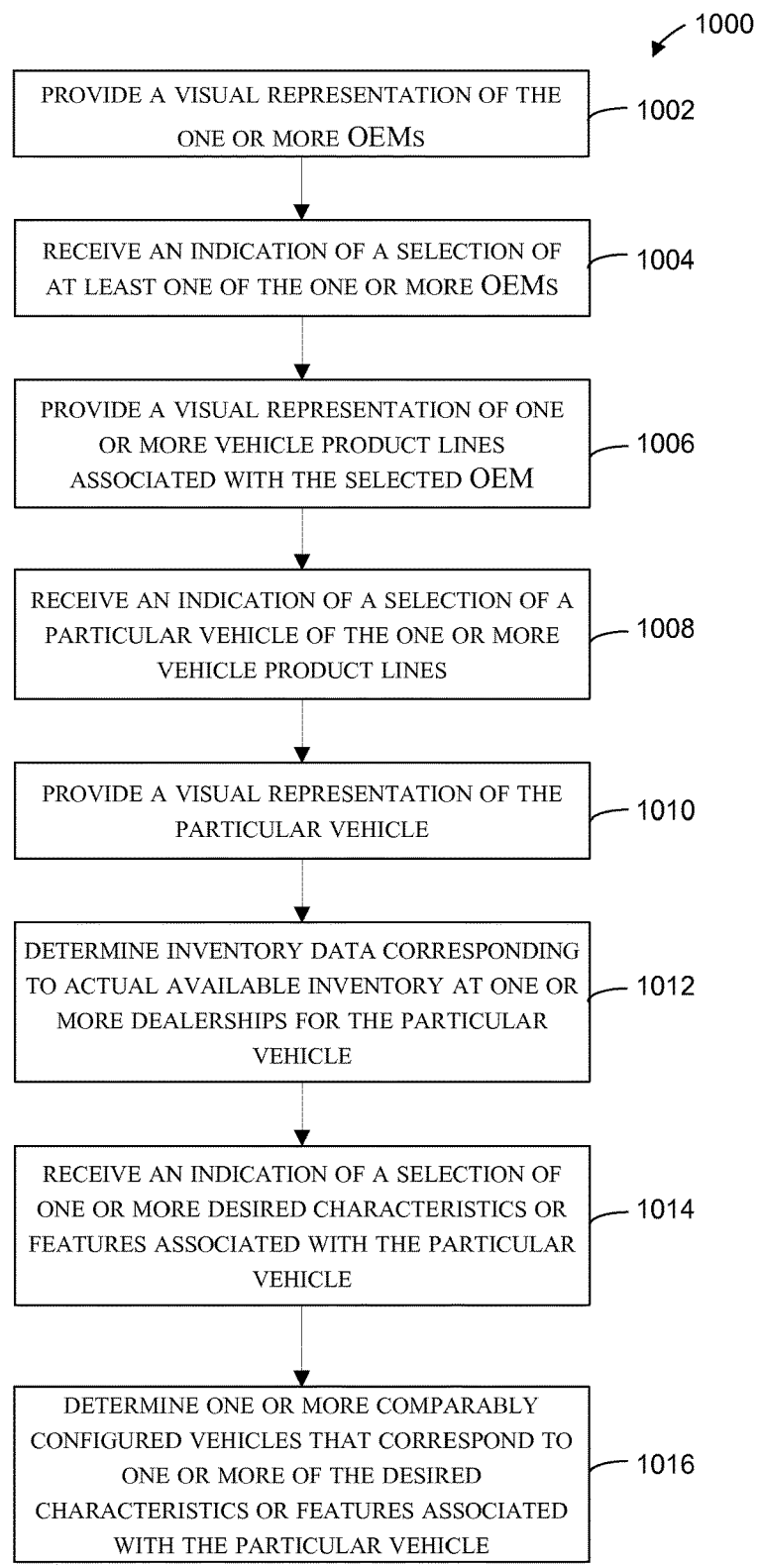
FIG. 10 is a flow diagram illustrating details of a method, according to an embodiment of the disclosure.
Figure 11:
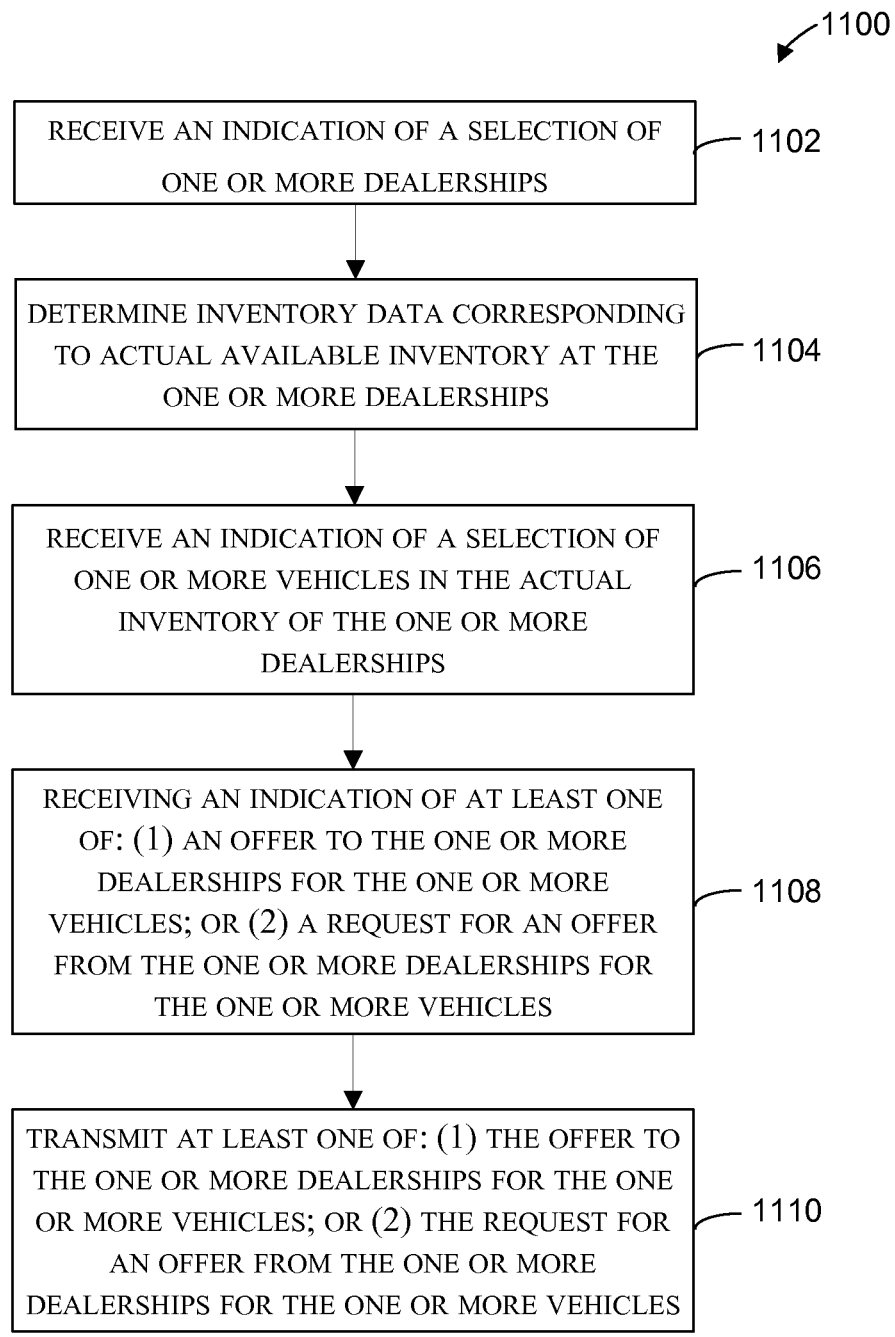
FIG. 11 is a flow diagram illustrating details of a method, according to an embodiment of the disclosure.

FIGS. 9-11 illustrate example flow diagrams showing processes 900, 1000, and 1100 respectively, for facilitating the purchase of one or more vehicles. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The process 900 may, but need not, be implemented by a computing device operated by a service provider, such as the service provider computer 110. In some aspects the process 900 may begin by receiving one or more weighted variables that each indicate a desired characteristic or feature of a vehicle at block 902. For example, the service provider computers 110 may receive the one or more weighted variables 502 via the interface 106 implemented at the user device 104 of FIG. 1. At block 904, the process 900 may determine one or more vehicles comprising one or more makes, models, trims, customizations, or combinations thereof. For example, the one or more vehicles may correspond to (or at least partially meet/match) the one or more desired characteristics or features of the vehicle. This may be determined by a service provider such as the service provider computer 110 of FIG. 1. In some examples, the configuration data may be determined from information received from one or more dealer, distributor, or OEM databases.

In some instances, the process 900 may then determine inventory data corresponding to actual available inventory at one or more dealerships at block 906. For example, the inventory data may correspond to each of the one or more vehicles that correspond to the one or more desired characteristics or features of the vehicle. In some examples, the inventory data may be filtered to a specific geographic region. The process 900 may also determine a metric indicative of a degree of match at block 908. For example, the degree of match may provide an indication of how closely matched each of the one or more vehicles and the one or more weighted variables are. At block 910, a ranking of the vehicles may be determined by the process 900. In some examples, the ranking may be based at least in part on the degree of match.

At block 912, the process may end by providing an indication of the desired characteristics differing in each of the one or more vehicles. For example, the indication may be provided via the interface 106 implemented at the user device 104 of FIG. 1. In this way, the users may be able to determine if certain comparable vehicles include one or more of the desired characteristics or features.

FIG. 10 illustrates a flow diagram showing process 1000. The process 1000 may, but need not, be implemented by a computing device operated by a service provider, such as the service provider computer 110. In some aspects, the process 1000 may begin by providing a visual representation of one or more OEMs at block 1002. In certain aspects, the arrangement and content associated with the visual representation of the one or more OEMs may be based at least in part on a predetermined relationship, such as a fee paid by the OEMs. At block 1004, the process 1000 may receive an indication of a selection of at least one of the one or more OEMs. For example, in some instances, a user may select one of the OEMs in order to view their product lines.

In some aspects, the process 1000 may then provide a visual representation of one or more vehicle product lines associated with the selected OEM at block 1006. In some instance, the content associated with the visual representation of the one or more vehicle product lines may be based at least in part on a predetermined relationship as noted above. Further, at block 1008, the process 1000 may receive an indication of a selection of a particular vehicle of the one or more vehicle product lines at block 1008. For example, in some instances, a user may select a particular vehicle via the user application interface 106 of FIG. 1. Additionally, in some aspects, the process 1000 may also provide a visual representation of the particular vehicle at block 1010. In some instances, the content associated with the visual representation of the particular vehicle may be based at least in part on a predetermined relationship as noted above. Further, the process 1000 may determine inventory data corresponding to actual available inventory at one or more dealerships for the particular vehicle at block 1012. In some aspects, the inventory data may be based at least in part on data received from one or more inventory databases of the one or more dealerships. In other aspects, the inventory data may be filtered to a geographic region.

At block 1014, the process 1000 may receive an indication of a selection of one or more desired characteristics or features associated with the particular vehicle. The process 900 may then end by determining one or more comparably configured vehicles that correspond to the particular vehicle and the one or more of the desired characteristics or features associated with the particular vehicle at block 1016. In certain aspect, the one or more comparably configured vehicles may include one or more makes, models, trims, customizations, or combinations thereof.

FIG. 11 illustrates a flow diagram showing process 1100. The process 1100 may, but need not, be implemented by a computing device operated by a service provider, such as the service provider computer 110. In some aspects, the process 1100 may begin by receiving an indication of a selection of one or more dealerships at block 1102. At block 1104, the process 1100 may determining inventory data corresponding to actual available inventory at the one or more dealerships. At block 1106, the process 1100 may receive an indication of a selection of one or more vehicles in the actual inventory of the one or more dealerships. Next, the process 1100 may receive an indication of at least one of: (1) an offer to the one or more dealerships for the one or more vehicles; or (2) a request for an offer from the one or more dealerships for the one or more vehicles at block 1108. The process 1100 may then end by transmitting at least one of: (1) the offer to the one or more dealerships for the one or more vehicles; or (2) the request for an offer from the one or more dealerships for the one or more vehicles at block 1110.

Illustrative methods and systems for facilitating the purchase of one or more vehicles are described above. Some or all of these systems and methods may, but need not, be implemented at least partially by architectures such as those shown in FIG. 1 above. It should be understood that certain acts in the methods need not be performed in the order described, may be rearranged or modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed is:

1. A method, comprising:
providing, over a network, by one or more computers comprising one or more processors, a visual representation of one or more Original Equipment Manufacturer (OEM)s, to one or more user computing devices;
receiving, by the one or more computers, an indication of a selection of at least one of the one or more OEMs from the one or more user computing devices;
determining, by the one or more computers, a first geographic location associated with one of the one or more user computing devices, wherein the first geographic location is a physical location of the one or more user computing devices;
determining, by the one or more computers, a second geographic location associated with a dealership of the one or more dealerships;
determining, by the one or more computers, that a distance between the first geographic location and the second geographic location is within a threshold distance;
determining, by the one or more computers, inventory data corresponding to available inventory associated with the one or more OEMs at the dealership;
providing, by the one or more computers and based at least in part on the indication of the selection of at least one of the one or more OEMs, content associated with the selected OEM to the one of the one or more user computing devices, wherein the content associated with the selected OEM comprises a visual representation of one or more vehicle product lines;
receiving, by the one or more computers, an indication of a selection of a particular vehicle of the one or more vehicle product lines;
sending, by the one or more computers and based at least in part on the indication of the selection of the particular vehicle, the inventory data, the second geographic location, and a visual representation of a vehicle in the available inventory that at least partially matches the particular vehicle to the one of the one or more user computing devices, the visual representation of the particular vehicle comprising one or more hyperlinks which specifies the location of a data source, wherein the data source stores one or more of: information associated with dealer incentives, payment tables, credit information, financing options, or insurance options for the particular vehicle, wherein the visual representation of the particular vehicle is configured to be displayed on the one of the one or more user computing devices and enables connection via the one or more hyperlinks to the data source over the network when the one or more user computing devices are in communication with the one or more computers;
determining, by the one or more computers, that the vehicle includes an additional feature that is not included in the particular vehicle, wherein the additional feature is a first vehicle characteristic difference;
determining, by the one or more computers, that the vehicle is missing a feature that is included in the particular vehicle, wherein the feature that is missing is a second vehicle characteristic difference; and
causing, by the one or more computers, the first vehicle characteristic difference and the second vehicle characteristic difference to be presented in a user interface element that is separate from a listing of features of the particular vehicle at the one of the one or more user computing devices.

2. The method of claim 1, wherein the arrangement of the plurality of OEMs is based at least in part on a predetermined relationship.

3. The method of claim 2, wherein the predetermined relationship is based at least in part on one or more of (i) a fee paid by the OEM for preferred placement, (ii) a saved preference received by the one or more computers, or (iii) a default placement.

4. The method of claim 1, wherein the content associated with the selected OEM is based at least in part on a predetermined relationship.

5. The method of claim 4, wherein the predetermined relationship is based at least in part on one or more of (i) a fee paid by the OEM for preferred placement, (ii) a saved preference received by the one or more computers, or (iii) a default content.

6. The method of claim 1, wherein the inventory data is based at least in part on data received from one or more inventory databases of the one or more dealerships.

7. The method of claim 1, wherein the visual representation of the particular vehicle comprises an interactive visual representation.

8. The method of claim 1, wherein providing content associated with the particular vehicle comprises one or more of: visual content associated with the particular vehicle, media content associated with the particular vehicle; one or more descriptions of characteristics, specifications, or features associated with the particular vehicle; news associated with the particular vehicle; a rating associated with the particular vehicle; or a location of one or more dealerships where the particular vehicle is available.

9. The method of claim 1, further comprising providing, by the one or more computers, information associated with one or more third parties.

10. The method of claim 9, wherein the one or more third parties comprise one or more service providers for financing a purchase of the particular vehicle or insuring the particular vehicle.

11. The method of claim 1, further comprising receiving, by the one or more computers, information associated with one or more of: the one or more OEMs, the one or more vehicle product lines, or the particular vehicle.

12. The method of claim 1, further comprising:
receiving, by the one or more computers, an indication of a selection of one or more desired characteristics or features associated with the particular vehicle; and
determining, by the one or more computers, inventory data corresponding to actual available inventory at the one of the one or more dealerships for the particular vehicle comprising the one or more desired characteristics or features, wherein the inventory data is based at least in part on data received from one or more inventory databases of the one or more dealerships.

13. The method of claim 12, further comprising determining, by the one or more computers and based at least in part on the one or more desired characteristics or features, one or more comparably configured vehicles comprising one or more makes, models, trims, customizations, or combinations thereof that correspond to the particular vehicle and the one or more of the desired characteristics or features associated with the particular vehicle.

14. The method of claim 13, further comprising providing, by the one or more computers, a comparison of the particular vehicle comprising the one or more desired characteristics or features and the comparably configured vehicles.

15. The method of claim 1, wherein receiving, by the one or more computers, an indication of a selection of a particular vehicle of the one or more vehicle product lines comprises:
receiving a selection of a first vehicle from an available inventory associated with a first dealership; and
receiving a selection of a second vehicle from an available inventory associated with a second dealership, wherein the selection of the first vehicle and the selection of the second vehicle are received from a website hosted by the one or more computers.

16. The method of claim 1, further comprising:
determining, by the one or more computers, content preference data associated with the one or more computing devices, wherein the content preference data indicates a content type preference of either video or image; and
selecting, by the one or more computers, the content associated with the selected OEM using the content preference data.

17. A computer system, comprising:
at least one memory that stores computer-executable instructions;
at least one processor configured to access the at least one memory, wherein the at least one processor is configured to execute the computer-executable instructions to:
provide a visual representation of the one or more Original Equipment Manufacturer (OEM)s to a user computing device over a network;
receive, from the user computing device, an indication of a selection of at least one of the one or more OEMs over the network;
determine a first geographic location of the user computing device;
determine a second geographic location associated with a dealership of the one or more dealerships;
determine that a distance between the first geographic location and the second geographic location is within a threshold distance;
determine inventory data corresponding to available inventory at one or more dealerships associated with the selected OEM at the dealership;
provide, based at least in part on the indication of the selection of at least one of the one or more OEMs, a visual representation of one or more vehicle product lines associated with the selected OEM, wherein the content associated with the visual representation of the one or more vehicle product lines is based at least in part on the predetermined relationship;
receive, from the user computing device, an indication of a selection of a particular vehicle of the one or more vehicle product lines over the network;
send, based at least in part on the indication of the selection of the particular vehicle, the inventory data, the second geographic location, and a visual representation of a vehicle in the available inventory that at least partially matches the particular vehicle to the user computing device over the network, the visual representation of the particular vehicle comprising one or more hyperlinks which specifies the location of a data source, wherein the data source stores one or more of: information associated with dealer incentives, payment tables, credit information, financing options, or insurance options for the particular vehicle, wherein the visual representation is configured to be displayed on the user computing device and enables connection via the one or more hyperlinks to the data source over the network when the user computing device is in communication with the computer system;
determine a first vehicle characteristic difference between the vehicle and the particular vehicle, wherein the first vehicle characteristic is an additional feature;
determine a second vehicle characteristic difference between the vehicle and the particular vehicle, wherein the second vehicle characteristic is a missing feature; and
cause the first vehicle characteristic difference and the second vehicle characteristic difference to be presented in a user interface element that is separate from a listing of features of the particular vehicle at the user computing device.

18. The computer system of claim 17, wherein the at least one processor is further configured to execute the computer-executable instructions to:
receive a selection of a first vehicle from an available inventory associated with a first dealership; and
receive a selection of a second vehicle from an available inventory associated with a second dealership, wherein the selection of the first vehicle and the selection of the second vehicle are received from a website hosted by the computer system.

19. One or more computer-readable media storing computer-executable instructions that, when executed by a server comprising at least one processor, configure the at least one processor to perform operations comprising:
receiving an indication of a selection of one or more dealerships from a user computing device over a network;
providing, based at least in part on the indication of the selection of the one or more dealerships, an application interface comprising a visual representation of one or more vehicle product lines associated with the selected dealership;
determining inventory data corresponding to actual available inventory at the one or more dealerships, wherein the inventory data is based at least in part on data received from one or more inventory databases of the one or more dealerships;
determining a geographic location of the user computing device and of the one of the one or more dealerships;
determining that a distance between the respective geographic locations is within a threshold distance;

receiving an indication of a selection of one or more vehicles in the actual inventory of the one of the one or more dealerships from the user computing device over the network;

providing, by the server and based at least in part on the indication of the selection of the particular vehicle, the inventory data, the geographic location of the one of the one or more dealerships, and a visual representation of a vehicle in the available inventory that at least partially matches the particular vehicle to the user computing device over the network, the visual representation of the particular vehicle comprising one or more hyperlinks which specifies the location of a data source, wherein the data source stores one or more of: information associated with dealer incentives, payment tables, credit information, financing options, or insurance options for the particular vehicle, wherein the visual representation of the particular vehicle is configured to be displayed on the user computing device and enables connection via the one or more hyperlinks to the data source over the network when the user computing device is in communication with the server;

determining a first vehicle characteristic difference between the vehicle and the particular vehicle, wherein the first vehicle characteristic is an additional feature;

determining a second vehicle characteristic difference between the vehicle and the particular vehicle, wherein the second vehicle characteristic is a missing feature;

causing the first vehicle characteristic difference and the second vehicle characteristic difference to be presented in a user interface element that is presented separately from a listing of features of the particular vehicle at the user computing device;

receiving an indication of at least one of: (i) an offer to the one or more dealerships for the one or more vehicles; or (ii) a request for an offer from the one or more dealerships for the one or more vehicles from the user computing device over the network; and transmitting at least one of: (i) the offer to the one or more dealerships for the one or more vehicles; or (ii) the request for an offer from the one or more dealerships for the one or more vehicles to the user computing device over the network.

20. The one or more computer-readable media of claim 19, wherein the at least one processor is further configured to perform operations comprising:

receiving a selection of a first vehicle from an available inventory associated with a first dealership; and receiving a selection of a second vehicle from an available inventory associated with a second dealership, wherein the selection of the first vehicle and the selection of the second vehicle are received from a website hosted by the server.

* * * * *